United States Patent [19]
Herrell et al.

[11] Patent Number: 5,347,634
[45] Date of Patent: Sep. 13, 1994

[54] SYSTEM AND METHOD FOR DIRECTLY EXECUTING USER DMA INSTRUCTION FROM USER CONTROLLED PROCESS BY EMPLOYING PROCESSOR PRIVILEGED WORK BUFFER POINTERS

[75] Inventors: Russ W. Herrell; Curtis R. McAllister; Dong Y. Kuo; Christopher G. Wilcox, all of Fort Collins, Colo.

[73] Assignee: Hewlett-Packard Company, Palo Alto, Calif.

[21] Appl. No.: 494,008

[22] Filed: Mar. 15, 1990

[51] Int. Cl.⁵ .............................................. G06F 13/28
[52] U.S. Cl. .................................... 395/250; 395/425; 364/242.3; 364/242.31; 364/238.3; 364/238.6; 364/DIG. 1
[58] Field of Search .................. 364/DIG. 1, DIG. 2; 395/725, 275, 325, 425, 250

[56] References Cited

U.S. PATENT DOCUMENTS

| | | | |
|---|---|---|---|
| 4,261,033 | 4/1981 | Lemay | 395/275 |
| 4,272,819 | 6/1981 | Katsumata et al. | 395/200 |
| 4,293,908 | 10/1981 | Bradley et al. | 395/275 |
| 4,435,780 | 3/1984 | Herrington et al. | 395/725 |
| 4,797,809 | 1/1989 | Sato et al. | 395/425 |
| 4,811,216 | 3/1989 | Bishop et al. | 395/425 |
| 4,874,164 | 10/1989 | Miner et al. | 273/1 E |
| 4,930,069 | 5/1990 | Batra et al. | 395/275 |
| 4,989,113 | 1/1991 | Hull, Jr. et al. | 395/725 |
| 5,001,624 | 3/1991 | Hoffman et al. | 395/375 |
| 5,056,010 | 10/1991 | Huang | 395/425 |
| 5,088,033 | 2/1992 | Binkley et al. | 395/500 |
| 5,097,411 | 3/1992 | Doyle et al. | 395/600 |
| 5,099,417 | 3/1992 | Magar et al. | 395/425 |
| 5,111,425 | 5/1992 | Takeuchi et al. | 395/425 |
| 5,165,073 | 11/1992 | Shaklee et al. | 358/451 |

OTHER PUBLICATIONS

Atkinson & Atkinson, *Using c*, Que Corporation, 1990, pp. 9–15, 325–340.

John G. Torborg, "A Parallel Processor Architecture For Graphics Arithmetic Operations," Computer Graphics, vol. 21, No. 4, Jul. 1987, pp. 197–204.

*Primary Examiner*—Thomas C. Lee
*Assistant Examiner*—Paul R. Lintz

[57] ABSTRACT

The present invention relates to an intelligent direct memory access (DMA) controller which interprets user commands from a host system, establishes work buffers for each user process, and retrieves blocks of data from the work buffers at the user's is request, rather than at the request of the kernel software. This is accomplished by establishing work buffers for each user process which are locked into physical memory. The controlling user process will then fill one work buffer, acquire the device semaphore, start physical DMA on the locked buffer, and then start filling another buffer. Memory integrity is maintained by allowing the user to access the work buffers for DMA without knowing their physical location in memory, via work buffer pointers from work buffer pointer registers which correspond to each work buffer for each user process. These work buffer pointer registers are privileged and are updated by the host processor for each new controlling user process.

48 Claims, 2 Drawing Sheets

PRIOR ART

SYSTEM AND METHOD FOR DIRECTLY EXECUTING USER DMA INSTRUCTION FROM USER CONTROLLED PROCESS BY EMPLOYING PROCESSOR PRIVILEGED WORK BUFFER POINTERS

BACKGROUND OF THE INVENTION

1. Field of the Invention

The present invention relates to a method and apparatus for providing direct access by an external data processing system to data stored in the main memory of a host system, and more particularly, to an interface method and apparatus for providing direct memory access by an external data processing system such as a graphics subsystem to physical memory of the host system by establishing work buffers in main memory of the host system for each user process and transferring data from the work buffers to the external data processing system under the user's control.

2. Description of the Prior Art

Generally, data transfer between the processor of a host system and an external data processing device is performed via an input/output (I/O) attachment under direct control of a program being run by the host processor. Typically, each byte or word of data requires the execution of several instructions to transfer. However, some I/O devices require higher data transfer rates than are achievable with this technique. For such devices, the I/O attachment may use a data transfer process known as direct memory access (DMA). DMA allows the direct transfer of data between the host processor memory and the I/O attachment without the necessity of executing instructions in the host processor. In particular, during DMA the host processor first initializes the DMA controller circuitry by storing a count and a starting memory address in its registers. Once started, DMA proceeds without further host processor intervention (except that an interrupt may be generated upon completion of the DMA operation), and hence data transmission is handled without the need to execute further instructions in the host processor.

Figure 1:
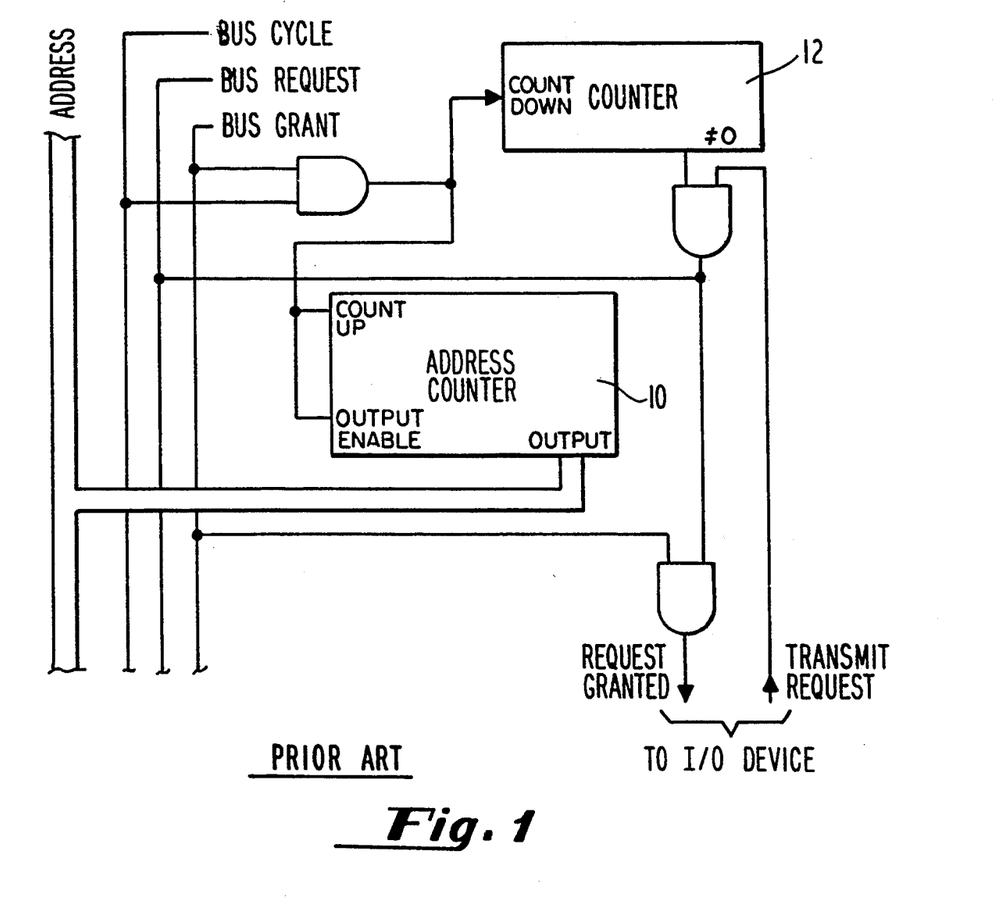
FIG. 1 schematically illustrates a prior art direct memory access (DMA) controller.

I/O attachments using such a DMA technique are known and generally incorporate circuitry of the type shown in FIG. 1. The host processor of the DMA controller of FIG. 1 sets the address counter and counter registers 10 and 12. The signal Bus Cycle is assumed to define the interval of time during which the addresses are presented and data are exchanged on the bus. The DMA controller also connects to the I/O attachment with the lines Transmit Request and Request Granted. During operation, when the I/O attachment wishes to use a bus cycle, it raises the voltage on the line Transmit Request. If the DMA count register 12 is nonzero, the signal is placed on the Bus Request line to the host processor. The host processor hardware periodically examines this signal, and when it is of a high logic level the host processor waits until the end of the current bus cycle, stops, places its address and data line drivers in the high-impedance state, and raises the voltage of the line Bus Grant. The host processor is thus effectively isolated from the bus during bus cycles granted to the DMA controller. When a high logic level of Bus Grant is sensed by the DMA controller, it places the contents of its address counter register 10 on the Address lines and signals the I/O attachment on Request Granted that it may use the current bus cycle for transmission of data. The I/O attachment itself may thus drive the bus lines that determine the direction of data transfer, or additional circuitry in the DMA controller may drive these lines. As long as Transmit Request is held at a high logic level, consecutive bus cycles may be used by the I/O attachment. Such a technique is known as "cycle stealing".

The circuitry of prior art FIG. 1 is capable of using successive bus cycles ("burst mode") or using bus cycles intermittently. The choice depends on the data transfer rate of the I/O attachment. In fact, the processor of the host system often must use several bus cycles in preparation for relinquishing the bus by generating Bus Grant, and must use several bus cycles after regaining the bus. These cycles are unproductive in that they do not contribute to instruction execution or data transfer. Therefore, DMA transfers that use consecutive bus cycles make more efficient use of the bus.

Thus, in order to reduce the load on the host processor when transferring data to an external data processing system, it is known to use DMA to fetch data from the main memory of the host system and to pass it to the external data processing system without requiring additional processor instructions. However, such prior art DMA techniques have been typically initiated by the kernel software in the host processor to guarantee the integrity of multi-user memory space and have not been initiated by an unprivileged user process of the host system. As a result, when a user application program of the host system calls for processing of large blocks of data as in conventional graphics processing or networking systems, user scheduled DMA has not been possible. Rather, access to the main memory of the host system has been typically provided through operating system or kernel software control in the host processor, thereby significantly slowing the overall data transfer time of the system and complicating user programming. Hence, it has heretofore been extremely difficult to perform real-time manipulations of graphics and other such complex data profiles under user direction.

Accordingly, there is a long-felt need for a process and apparatus which enables an external process to access data in the main memory of a host system under user control whereby the time required for data transfer to the external process or data processing system can be substantially reduced so as to allow real-time data manipulation without losing system security. The present invention has been designed for this purpose.

SUMMARY OF THE INVENTION

The above-mentioned long-felt need has been met in accordance with the present invention, which relates to an intelligent direct memory access (DMA) controller which interprets user commands from a host system, establishes work buffers in main system memory for each controlling user process, and retrieves blocks of data from the work buffers at the user's request, rather than at the request of the operating system software of the host processor. This allows for rapid data access to be accomplished at the user's request, not the kernel's, while maintaining access security in a multi-user system.

In accordance with the invention, an interface device is provided for transferring data processing commands and associated data between a user's host system, having a main memory and host processor, and an external data processing system. In particular, the interface device in accordance with the invention comprises a work buffer for each user process being processed by the host processor for storing the data processing commands and associated data for its associated user process. A work buffer pointer register containing a work buffer pointer to the work buffer for the controlling user process is also provided, where the stored work buffer pointer is unique to the controlling user process. Finally, the interface device of the invention comprises means responsive to a user instruction from the controlling user process for reading the data processing commands and associated data from the work buffer starting at the address pointed to by the work buffer pointer and for transferring the data processing commands and associated data to the external data processing system. Such a direct memory access system is preferably used in conjunction with a graphics subsystem connected to the user's host system, where the data processing commands are graphics commands and the associated data comprises graphics primitives. However, the external data processing system may be a communications network or some other such system in which direct memory access is desirable.

In a preferred embodiment, the work buffer for each user process is created in main memory of the host system, and preferably, two such registers are created for each user process so that one work buffer may be accessed for DMA while the other is being written. In such an arrangement, two work buffer pointer registers are preferably provided, one for each work buffer, where each work buffer pointer points to a corresponding work buffer. Each work buffer pointer is unique to its associated process and is updated by the kernel to point to the new work buffer when the old controlling user process is replaced by a new controlling user process. Also, each work buffer pointer register is preferably mapped onto a privileged page in the host processor's address space to main memory so that the work buffer pointers may not be accessed by a controlling user process, thereby allowing system security to be maintained.

During operation, the user instruction is passed on from the controlling user process to the interface device and specifies which work buffer is to be accessed by DMA and hence which work buffer pointer register needs to be read to get the proper pointer. The user instruction also specifies the number of words of data which are to be read by DMA from the selected work buffer as well as when the read may occur. For this purpose, a control register is preferably provided which is responsive to the user instruction for initiating the DMA. The control register may also be read to determine the status of the DMA operation, i.e., whether a DMA is in progress, whether a DMA error has occurred, which work buffer is being read, how many words are being read and the like.

Also, in a preferred embodiment the work buffer pointer points to the starting address of its associated work buffer, although the work buffer pointer may itself be an address offset for locating data within its associated work buffer. In addition, the host processor operation may be synchronized to the DMA in accordance with the invention and data consistency techniques may be implemented to prevent attempted DMA or data accesses by the controlling user process before a previous DMA operation has been completed or to insure that the cached data is properly used.

In accordance with another aspect of the invention, an interface device is provided for transferring graphics commands and graphics primitives between a user's host system, having a main memory and host processor, and a graphics processing subsystem. This interface device preferably accesses at least two work buffers for each unprivileged user process of the host processor, where the work buffers are used for selectively storing the graphics commands and graphics primitives for their associated user process, and where these work buffers are locked in physical memory to prevent a virtual memory operating system from swapping these buffers out to a secondary storage device or reassigning their physical addresses. Also, two work buffer pointer registers are provided, one for each work buffer, for respectively storing work buffer pointers to the work buffers for the controlling user process, where each work buffer pointer is unique to the controlling user process. Finally, the interface device also comprises means responsive to a user instruction from the controlling user process for reading the graphics commands and graphics primitives from a work buffer selected by the user at the address pointed to by the corresponding work buffer pointer, and for transferring the graphics commands and graphics primitives to the graphics subsystem. As in the previous embodiment, the work buffer pointers are unique to the user process and are updated to point to the new work buffers when the device semaphore is passed to a new controlling user process by the kernel.

The invention also comprises a method for providing direct memory access by an external data processing system to data stored in a main memory of a user's host system in response to a user's data processing command. This method generally comprises the steps of:

defining a work buffer for each user process being processed by the user's host system;

writing the user's data processing commands and associated data in the work buffer defined for the controlling user process;

defining a work buffer pointer register for the controlling user process, the work buffer pointer register containing a work buffer pointer to a corresponding work buffer, the work buffer pointer being unique to the controlling user process;

reading, in response to a user instruction from the controlling user process, the data processing commands and associated data from the work buffer for the controlling user process starting at an address pointed to by the work buffer pointer for the controlling user process; and transferring the data processing commands and associated data from the work buffer for the controlling user process to the external data processing system.

This method of the invention may also include the steps of mapping the work buffer pointer register onto a privileged memory page so as to be inaccessible to the controlling user process and updating the work buffer pointer in the work buffer pointer register to include an updated work buffer pointer when the controlling user process is swapped out. The method may also include the step of synchronizing the processing by the user's host system to the DMA to prevent attempted DMA to "dirty" memory. Also, data consistency problems may be prevented by flushing a cache memory of the main memory before each DMA is attempted.

Another preferred method for providing direct memory access by an external data processing system to data stored in a main memory of a user's host system in response to a user's data processing command in accordance with the invention comprises the steps of:

defining at least two work buffers in main memory for each user process being processed by the user's host system;

acquiring a memory lock on the work buffers for the controlling user process;

writing the user's data processing commands and associated data to one of the work buffers defined for the controlling user process;

defining two work buffer pointer registers respectively containing work buffer pointers to different work buffers for the controlling user process, each work buffer pointer being unique to the controlling user process;

issuing a user instruction to start direct memory access from a selected one of the work buffers;

reading the data processing commands and associated data from the selected work buffer starting at an address pointed to by the work buffer pointer corresponding to the selected work buffer for the controlling user process; and transferring the data processing commands and associated data from the selected work buffer to the external data processing system.

Such methods and apparatus in accordance with the invention allow a user to schedule DMA at his or her discretion without interrupting the host processor with an operating system kernel call each time DMA is desired. As a result, valuable computation time of the host processor is not wasted for simple data transfers.

BRIEF DESCRIPTION OF THE DRAWINGS

The objects and advantages of the invention will become more apparent and more readily appreciated from the following detailed description of the presently preferred exemplary embodiments of the invention taken in conjunction with the accompanying drawings of which.

DETAILED DESCRIPTION OF THE PRESENTLY PREFERRED EMBODIMENT

The inventors of the subject matter disclosed and claimed herein have satisfied the above-mentioned long-felt needs in the art by developing a host interface process and apparatus which allows an external data processing system such as a graphics subsystem to access data directly from main memory of the host system under user control without requiring the kernel to initiate and control each memory access.

In accordance with the invention, data may be transferred directly to and from the external data processing system from the main memory of the host system in response to the user's commands, not the kernel's commands. As a result, the host processor no longer must spend valuable computation time performing routine data copies. An interface device with these and other beneficial features in accordance with presently preferred embodiments of the invention now will be described with reference to FIGS. 2 and 3.

Figure 2:
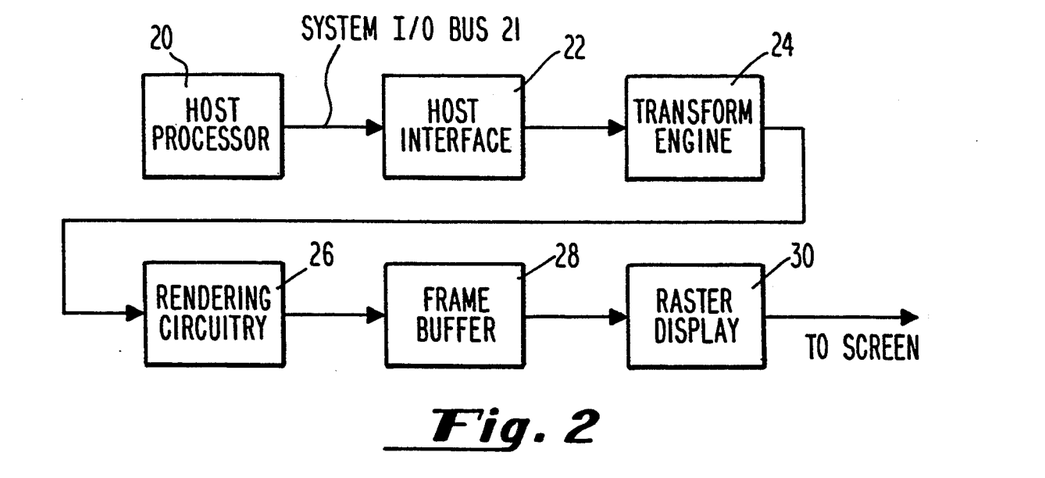
FIG. 2 schematically represents a conceptual block diagram of a host system and graphics processing system connected by a host interface embodying the present invention.

As shown in FIG. 2, the invention will be described generally in conjunction with a host processing system and a graphics subsystem of the host system; however, it will be appreciated by those of ordinary skill in the art that the invention may be used in other environments as well. Moreover, the description given herein is for exemplary purposes only and is not intended in any way to limit the scope of the invention. All questions regarding the scope of the invention may be resolved by referring to the appended claims.

FIG. 2 shows a host processing system interfaced with a graphics subsystem by a host interface incorporating the invention. As shown, the processing system comprises a host processor 20 which is interfaced via system I/O bus 21 and PDMA host interface 22 to a graphics transform engine 24. The output of the transform engine 24 is input to graphics rendering circuitry 26 and then to a frame buffer 28. The output of the frame buffer 28 is then received by raster display 30 and output to a CRT screen, for example. As will be described in detail below, the present invention is particularly directed to the host interface circuitry 22 of FIG. 2 and the physical direct memory access (PDMA) process performed by host interface circuitry 22 for allowing data to be transferred directly between the main memory of the host processor 20 and the graphics subsystem including transform engine 24, rendering circuitry 26, frame buffer 28 and raster display 30 without the immediate intervention of the operating system (or kernel) of host processor 20.

Generally, for DMA to be responsive to user input to the host processor 20, the user input must either be in a low level language (such as Assembly language) which directly references actual memory addresses, or as is usually the case, the user input must be converted from addresses in user memory space (or "virtual memory" space) to physical memory addresses. A novel system for providing user scheduled direct memory access using addresses in virtual memory space is described in detail in related application Ser. No. 07/492,518 filed Mar. 12, 1990, now abandoned and continued as FWC 08/018,479 assigned to the assignee of this invention and incorporated herein by reference. As will be described with respect to FIG. 3, the present invention provides user scheduled DMA without resorting to either of these techniques by establishing work buffers in main memory of the host processor for each user process and then providing pointers to the work buffers upon the user's request for DMA. Such DMA activity in accordance with the invention will hereinafter be referred to as physical DMA, or PDMA for short.

Figure 3:
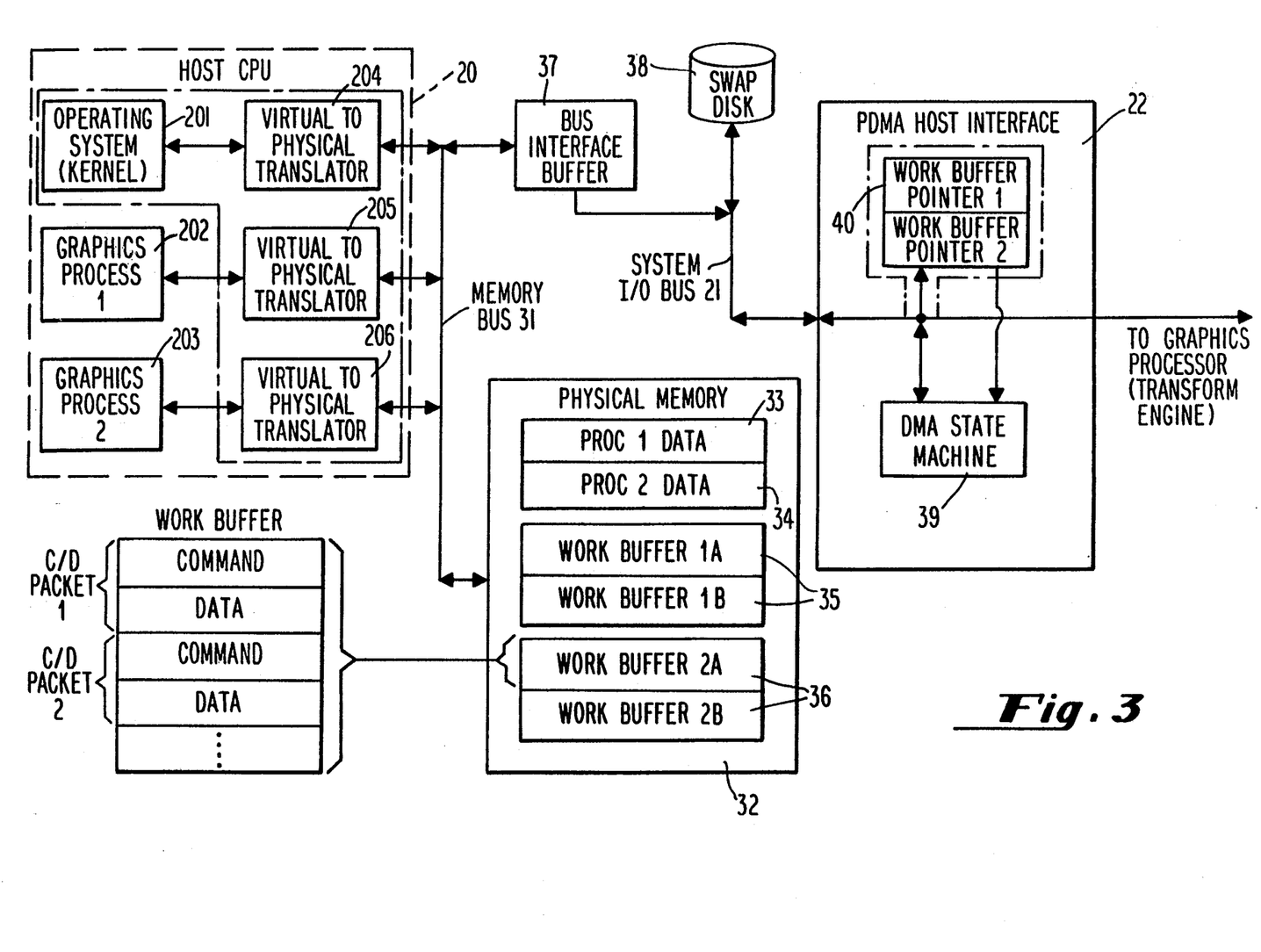
FIG. 3 schematically illustrates a user-scheduled direct memory access system for interfacing a host system to a graphics subsystem in accordance with the invention.

FIG. 3 illustrates a block diagram of the various components of the invention. As shown, the system of the illustrated embodiment of the invention interfaces a host central processing unit (CPU) 20 to a graphics processor (not shown) over a system I/O bus 21. The host CPU 20 generally comprises an operating system (or kernel) 201 for performing processing functions and software driven memory access. The host CPU 20 runs one or more user application programs such as graphics processes 1 and 2 illustrated as elements 202 and 203, respectively. Since each user of the host CPU 20 operates in his or her own virtual memory space, memory mapping is provided by virtual to physical translators (memory management units) 204, 205 and 206 for respectively translating the virtual addresses output by the operating system 201 and graphics processes 1 and 2. (Operating system or kernel 201 as well as the virtual to physical translators 204, 205 and 206 are kernel privileged and are so indicated by being enclosed within a dotted line.) The translated physical addresses are then sent across memory bus 31 for accessing main (physical) memory 32 associated with the host CPU 20. Preferably, main memory 32 includes data sections 33 and 34 and work buffers 35 and 36 for each user process (e.g., graphics processes 1 and 2). As will be described in further detail below, each work buffer 35 and 36 respectively stores the commands and data associated with the commands as "C/D packets" until the commands and data are passed downstream to the graphics processor or graphics "pipeline" at the user's request in accordance with the invention. In any event, once established, the user can initiate DMA to and from these buffers using the techniques described below without kernel intervention. As a result, only one kernel call per process is required if a work buffer is to be swapped (not per graphics primitive or per buffer swap as in the prior art).

Communications between memory bus 31 and the PDMA host interface 22 are accomplished across system I/O bus 21 via bus interface buffer 37. Bus interface buffer 37 generally provides for noninterfering bidirectional data transfer between the memory bus 31 and system I/O bus 21 and also coordinates transfers of data between main memory 32 and auxiliary memory (swap disc) 38 or PDMA host interface 22. In particular, the bus interface buffer 37 functions to link the system memory bus 31 with the system I/O bus 21 during page swaps with external memory (swap disk) 38 and during DMA transfer with PDMA host interface 22 in accordance with the invention.

PDMA host interface 22 preferably comprises a DMA state machine 39 which provides DMA read requests to main memory 32 from PDMA host interface 22. PDMA host interface 22 also comprises work buffer pointer registers 40 which contain physical pointers to the starting addresses of the two work buffers (e.g., 1A and 1B) in main memory 32 which are in use by the process (i.e., 1) which owns the lock to the graphics hardware. These registers are privileged and may only be written by the kernel 201 in order to maintain security. These work buffer pointers will be described in more detail below.

The embodiment thus arranged is preferably used with command/data (C/D) packets containing a predetermined command and the data (graphics primitives) associated therewith, but the work buffers may also be used in conjunction with a command/pointer (C/P) architecture in which data packets (C/P packets) containing a command and pointers to the data associated with the command are converted to conventional command/data packets for processing by the graphics processor as described in the aforementioned related application. Thus, although the invention will be described for use primarily with C/D packets, it will be appreciated by those skilled in the art that C/P packets also may be used in the present invention in accordance with the techniques disclosed in the aforementioned related application. In fact, those skilled in the art will appreciate that the techniques of that application may be used in conjunction with the techniques herein disclosed to provide an integrated user scheduled DMA controller in which physical and virtual DMA techniques are selectively used In any event, as used herein, "C/D packets" generally consist of one or more 32-bit words of command followed by zero or more words of data.

The PDMA process in accordance with the invention functions generally as follows. Initially, host CPU 20 gives blanket approval to all DMA by PDMA host interface 22 for a particular process, thereby obviating the need for kernel calls each time DMA is performed. The user applications software (i.e., graphics process 1 or 2) in the host CPU 20 then assembles work buffers 35 or 36 in main memory 32 containing a series of C/D packets for each graphics process. Each process is provided with its own set of at least two work buffers (A and B) so as to eliminate the need for mutual exclusion while the data is copied into the work buffer. Obtaining the semaphore of the graphics device is necessary only when the work buffer is ready to be sent to the graphics processing circuitry via DMA.

Thus, at least two work buffers are provided and locked down in physical memory in accordance with the invention for each controlling user process. Pointers to these buffers in physical address space are then stored in work buffer pointer registers 40 for the controlling user and maintained by the kernel 201. These work buffer pointer registers 40 are preferably mapped only onto privileged memory pages so as to prevent an unauthorized user from performing DMA from anywhere in system memory. The kernel 201 will make sure these work buffer pointer registers 40 correspond to the process which has the semaphore to use the DMA technique of the invention and will make certain that the proper security and privileges are attached.

During operation, a process performing graphics, for example, will fill one work buffer (1A), acquire the device semaphore, start physical DMA on the full buffer 1A, and then start filling the other buffer (1B). These buffers will thus store commands with their associated data in system memory rather than in dedicated hardware, whereby each process can have its own work buffers. As a result, the contents of the work buffers may be transferred via bus interface buffer 37 to the graphics processor (not shown) under the user's control, as will be described in further detail below. The resulting C/D packets may then be used by the graphics subsystem to perform the graphics manipulations requested by the user with the data specified by the user.

In order to assure proper operation and data consistency, the data in the C/D packets must be flushed from a cache of host CPU 20 back to main memory 32 to guarantee that the PDMA in accordance with the invention can access the data. This is known as data flushing. In addition, the user's application program must not be allowed to alter this data until after the DMA has read it. In other words, the host CPU 20 must be synchronized to the DMA process. For this purpose, a synchronizing function may be implemented to synchronize the user's application program to the graphics hardware before any data is altered in the main memory 32, and the PDMA host interface 22 hardware may also guarantee that the caches of the host CPU 20 are consistent with main memory 32 for any DMA accesses. On the other hand, the data caches may be flushed by the user's application program before DMA is attempted. Hardware and software solutions to these problems will be discussed in more detail below.

The details of the work buffers in accordance with the invention will now be described with continued reference to FIG. 3.

Work buffers 35 and 36 of physical memory 32 preferably comprise arrays of 32-bit words, which may be, for example, 512 words long. As a result, PDMA operations in accordance with the invention must be on no more than 512 32-bit words at a time. The work buffers 35 and 36 are preferably aligned on a 512 word boundary so as not to cross a physical page boundary. In any event Work buffers in main memory 32 must be aligned on Page boundaries and must be no bigger than a physical page in order to prevent page faults. In addition, the work buffers 35 and 36 are typically allocated from locked pages which are either write-through or copyback pages for the reasons given below. The work buffers 35 and 36 also must contain a valid C/P or C/D packet at the beginning of the work buffer and may contain either a word buffer link or work buffer end command as the last valid data packet in the work buffer. Moreover, each work buffer must be flushed from the cache of the host CPU 20 and must be locked before being "swapped" whenever the graphics subsystem is running on a host CPU that does not allow snooping of DMA reads or does not use write-through pages, whereas if the work buffers are allocated from write-through pages the cache need not be flushed before swapping. Furthermore, it may be necessary for the software of the host CPU 20 to include state save and restore commands at the head of a work buffer any time the controlling user is changed.

Work buffers 35 are used for DMA in accordance with the invention as follows. Namely, the user's application program builds the work buffer 35 with C/D packets and flushes the cache of the host CPU 20 if necessary. The user's application program then acquires a lock to the graphics hardware and work buffer if necessary. Then the user's application program checks the flags on a status register of the graphics processor to verify that there is room for the contents of the present work buffer. When room is available, the user's application program writes the word count and buffer number (A or B) to control registers of DMA state machine 39. DMA state machine 39 will then read the physical address of the desired work buffer (A or B) from work buffer pointer registers 40 and begin physical DMA using the read addresses as base addresses or address indexes for accessing the desired work buffer memory space in main memory. Processing of the next buffer (B or A) then begins at the other address indicated in work buffer pointer registers 40. The user's application program thus maintains control over which of the two buffers is in use by specifying which of the two pointers to use, and once a user process has been given control over the graphics process, it may continue to pass work buffer commands to the graphics hardware via DMA in accordance with the invention until a new controlling user is established by kernel 201 by changing the pointers in work buffer pointer registers 40.

DMA state machine 39 functions as a bus controller to coordinate the data transfer among the host CPU 20, the main memory 32 and the graphics processor. In particular, the DMA state machine 39 may support host initiated block moves from one of the work buffers 35 to the input circuitry of the transform engine 24. For example, write commands by the user's application program (process 1 or 2) to DMA state machine 39 may be used to start physical DMA in accordance with the invention. Upon receipt of such a write command, which preferably specifies which work buffer to use (A or B) and the number of words to transfer, the corresponding work buffer pointer is read from work buffer pointer registers 40. DMA may then proceed by reading the data in the preselected work buffer starting at the beginning of the work buffer. On the other hand, read commands from the application program of the contents of DMA state machine 39 may be used to determine the status of the DMA operation (i.e., whether a DMA operation has completed and whether an error occurred during the DMA).

In a preferred embodiment of the DMA state machine 39, the DMA operation is controlled by reference to a DMA state machine control register. Although only a single register is defined herein, one skilled in the art will appreciate that numerous registers may be used to perform the functions herein defined as well as other functions suitable to the particular environment. For example, the DMA state machine 39 may be modified to include numerous additional registers in order to implement the virtual DMA technique described in detail in the aforementioned related application.

In accordance with a preferred embodiment, the DMA state machine control register (or bus control register) may be used to initiate the DMA transaction when a write command having a proper value is received. On the other hand, the status of the DMA transaction may be determined by reading the appropriate bits of the control register. For this purpose, the DMA state machine control register may include a start bit which, when set, causes the DMA state machine 39 to start the DMA operation and to indicate that DMA is in progress should a further command be received. When the DMA operation is completed, this bit will be cleared. Another field of the DMA state machine control register may be used to indicate DMA failure during the previous DMA operation. A snoop enable bit may also be provided since non-snooped bus transactions are preferred in accordance with the invention, as will be described below. Work buffer bits of the DMA state machine control register may also indicate which work buffer pointer (A or B) will be used to source the starting address of the DMA transaction. In addition, a mode field may be used to indicate what kind of transaction that the DMA state machine 39 needs to perform. The kinds of transactions may be block moves or single writes to the input of the graphics processor, for example. Finally, the DMA state machine control register preferably includes a count field which indicates the number of 32-bit words to be transferred. Of course, other control bits may be used by those skilled in the art as desired.

As previously described, work buffer pointer registers 40 contain physical pointers to at least two work buffers in main memory 32 which are locked by the kernel 201. Only kernel 201 is allowed to update these registers. Hence, access to work buffer pointer registers 40 is privileged, as indicated by the dotted line about work buffer pointer registers 40. In particular, the addresses in work buffer pointer registers 40 are changed only by kernel 201 when the device semaphore is passed from one process to another. Thus, the work buffer pointer registers 40 are updated by kernel 201 to include appropriate addresses for the new controlling user. Then, once the new process has control over the graphics subsystem, the process may continue to pass work buffer commands to the graphics hardware until a new controlling user is established.

Previously, when DMA was initiated only by the kernel, the kernel took care of any data consistency problems. In accordance with the PDMA technique of the invention, on the other hand, the user initiates DMA. Hence, new consistency problems now arise.

Namely, there are two types of consistencies to be concerned with. One is the DMA/CPU consistency where the CPU must promise not to alter data until the DMA process has finished with it. The other problem is the consistency of the data between the cache and main memory 32. The present invention may also include means for resolving these consistency problems.

For example, performing DMA operations on data structures while they are still accessible to the application program is not allowed for solving CPU/DMA data consistency problems, unless the application understands the DMA process and accepts responsibility to not edit such structures until DMA is complete. Hence, the user process should understand the DMA so as to be responsible for the synchronization between edits and DMA activity. Many user application programs, because they use a direct call to implement a display list, can assume this responsibility. Accordingly, physical DMA can be enabled by an explicit request from the application program. Moreover, by enabling DMA, the application code may synchronize with the DMA before editing any of the data which is sent to the graphics process via DMA. One skilled in the art will know how to modify the application program accordingly.

Because of cache/main memory inconsistencies, on the other hand, in order for any DMA read process to work properly it is necessary for any relevant dirty lines in any caches to be flushed back to main memory 32 as mentioned above before DMA is allowed or else the DMA must be given access to dirty data in the caches. Also, on DMA writes to main memory 32 in accordance with the invention, either the caches are flushed both before and after the DMA executes, or the DMA is allowed to update or invalidate any copies in the cache during DMA.

Thus, when a write access to the work buffers of main memory 32 is made by the host processor 20 in accordance with the invention, the main memory location and its cache copy (if there is a hit) may be updated simultaneously. This is called write-through or store-through. Thus, using this technique there is never a need to replace a block from cache, for it can simply be erased without copying it into main memory 32. Another approach is to update only the cache on a write hit. Then, when a modified cache block is replaced on a future miss, it must be recopied into main memory 32. This is known as copy-back. Any such technique may be used in accordance with the invention to maintain data integrity.

On the other hand, cache/main memory data consistency may be achieved in accordance with the invention by snooping all accesses to copy-back pages. For example, on DMA writes to main memory 32, any cache hits may cause that cache line to be invalidated. On DMA reads from main memory 32 in accordance with the invention, however, any dirty cache hits may cause the cache to supply the data instead of the main memory 32. However, since snooping generally slows down both the CPU and the PDMA accesses, snooping should be avoided whenever possible by the use of write-through pages and explicit flushes. Snooping can be avoided by using dirty data in write-through pages which are already in main memory 32 as long as the DMA start-up is guaranteed to occur after any write buffers are flushed, for PDMA reads from a write-through page do not have to be snooped. By contrast, PDMA writes to a write-through page must be snooped so that any cache copy will be updated or invalidated.

Cache consistency can thus be made invisible to user level code. Whether or not to use snooping or user controlled flushing can be left to the discretion of those skilled in the art.

In accordance with a preferred embodiment of the invention, all data read via DMA is read from write-through pages so that the caches do not have to be snooped. The user's application program must therefore allocate all display list data in write-through pages. On the other hand, the kernel driver can force the user's pages to write-through when PDMA is enabled. For example, the user instruction which enables DMA may also cause the kernel to convert all or part of the application program's pages to write-through.

In accordance with other preferred embodiments of the invention, the PDMA host interface 22 may also support snooping on all burst accesses to copy-back pages so that even if the user does nothing but enable DMA, the interface 22 will work without cache flushing. In addition, DMA may write to main memory 32 at write-through pages which are always purged after completion of DMA.

However, should write-through pages not be used, to overcome potential data consistency problems for user controlled DMA the host CPU 20 will preferably implement the following steps. First, after they are completed but before they are swapped, all work buffers 35 will be explicitly flushed to main memory 32 by the application program. Then, all display list elements should also be explicitly flushed to main memory 32 by the application program after being edited but before any PDMA is allowed. Also, both before and after any frame buffer block reads are executed, the receiving buffer must be flushed to main memory 32 by the application program. Moreover, before any frame buffer block writes are executed, the source buffer must be flushed to main memory 32 by the application program, and after PDMA is enabled for direct call the user's data cache should also be flushed to main memory 32 by the application program. These steps may be performed by the user application software in order to permit user scheduled memory access.

The PDMA host interface 22 as described above allows an external process such as a graphics subsystem to access data directly from memory. This reduces the bus bandwidth requirements since data travels straight to the graphics subsystem instead of from the main memory 32 to the host CPU 20 and then to the graphics subsystem. As a result, the host CPU 20 no longer must spend its valuable computational time performing routine data copies so that more real work is accomplished and memory bus utilization is increased. The present invention also has the benefit that the host user's level software can initiate direct access to memory using work buffer pointers without subrouting calls to kernel services. Such kernel calls are extremely time consuming, and by eliminating the need for such kernel calls in accordance with the invention, normal DMA techniques may now be applied in accordance with the invention to access graphics primitives. Moreover, due to its simple structure, the present invention is simple to implement at a minimal cost.

Although a number of exemplary embodiments of the invention have been described in detail above, those skilled in the art will readily appreciate that many additional modifications are possible in the exemplary embodiments without materially departing from the novel teachings and advantages of the invention. For example, the same DMA techniques used in accordance with the invention may be used for an external networking subsystem rather than a graphics subsystem as described. Any other subsystem also may be used in which it is desirable for the user to be able to directly access the data in the main memory without the necessity of interrupting the operating system for each such memory access. Also, as noted herein, the technique herein disclosed may be combined with that disclosed in the aforementioned related application to provide an interface system between a host processor and an external processor for all ranges of user speed and cost requirements. Moreover, the addresses read from work buffer pointer registers 40 may be used in conjunction with offset values which are added to the pointer values to locate the work buffers in main memory. Accordingly, all such modifications are intended to be included within the scope of this invention as defined in the following claims.

What is claimed:

1. A device for transferring data processing commands and associated data between a user's host system, having a main memory and host processor, and an external data processing system via user controlled direct memory access (DMA) comprising:

a work buffer in said main memory which is locked for a DMA controlling user process of said host processor, said work buffer storing said data processing commands and associated data for said DMA controlling user process;

a work buffer pointer register containing a work buffer pointer to said work buffer for said DMA controlling user process, said work buffer pointer being unique to said DMA controlling user process and said host processor having privileged access to said work buffer pointer register whereby said work buffer pointer is unmodifiable by said DMA controlling user process either directly or indirectly; and means responsive to a user DMA instruction from said DMA controlling user process for reading data processing commands and associated data specified in said user DMA instruction from said work buffer starting at the address pointed to by said work buffer pointer and for transferring, via DMA, said data processing commands and associated data from said work buffer to said external data processing system.

2. A device as in claim 1, wherein said external data processing system comprises a communications network.

3. A device as in claim 1, wherein said external data processing system comprises a graphics subsystem of said user's host system.

4. A device as in claim 3, wherein said data processing commands comprise graphics commands and said associated data comprises graphics primitives.

5. A device as in claim 4, wherein two work buffers are created for each of said plurality of user processes being processed by said host processor, whereby one work buffer may be read while the other is written.

6. A device as in claim 5, wherein two work buffer pointer registers are provided, one for each work buffer, whereby each work buffer pointer register contains a work buffer pointer to different ones of said work buffers, each work buffer pointer being unique to the DMA controlling user process.

7. A device as in claim 6, wherein each of said work buffers comprises 512 32-bit words, each work buffer being aligned so as not to cross a page boundary of said main memory.

8. A device as in claim 7, wherein a page in said main memory containing said work buffers is locked by the DMA controlling user process.

9. A device as in claim 6, wherein said work buffer pointer registers may not be accessed by the DMA controlling user process and are updated by said host processor to include updated work buffer pointers when the DMA controlling user process is swapped out.

10. A device as in claim 9, wherein said work buffer pointer registers are mapped onto at least one privileged page in said main memory so as to prevent access by the DMA controlling user process.

11. A device as in claim 6, wherein said reading and transferring means comprises means responsive to said user DMA instruction for specifying which of said work buffer pointer registers a work buffer pointer is to be read from and hence which work buffer said data processing commands and associated data are to be read from.

12. A device as in claim 11, wherein said specifying means further specifies the number of words to be read from the specified work buffer.

13. A device as in claim 12, wherein said specifying means comprises a control register which initiates said data reading and transferring when a user DMA instruction requesting DMA is received from the DMA controlling user process.

14. A device as in claim 13, wherein said control register includes status means for determining at least one of whether a data reading and transferring process is in progress, whether an error occurred in a previous data reading and transferring process, which of said work buffer pointer 15. A device as in claim 13, wherein said user DMA instruction includes instructions from the user as to which of said work buffers to read, the number of words to be read and when said read is to occur.

16. A device as in claim 1, wherein the work buffer pointer for the DMA controlling user process points to the starting address of the work buffer for the DMA controlling user process.

17. A device as in claim 1, wherein each work buffer pointer is an address offset used to determine an address within the corresponding work buffer.

18. A device as in claim 1, wherein said reading and transferring means comprises a bidirectional bus buffer and an input/output bus for connecting said external data processing system to said host processor and said main memory.

19. A device as in claim 18, wherein said bidirectional bus buffer provides noninterfering bidirectional data transfer between said main memory and said external data processing system in response to said user DMA instruction.

20. A device as in claim 1, further comprising synchronizing means for synchronizing said host processor to reads by said reading and transferring means.

21. A device as in claim 1, further comprising means for providing data consistency in said main memory between subsequent reads by said reading and transferring means by selective use of data snooping and user controlled data flushing of a cache of said main memory.

22. A device for transferring graphics commands and graphics primitives between a user's host system, having a main memory and a host processor, and a graphics processing subsystem via user controlled direct memory access (DMA) comprising:
- at least two work buffers in said main memory which are locked for a DMA controlling user process of said host processor, each work buffer selectively storing said graphics commands and graphics primitives for said DMA controlling user process;
- work buffer pointer registers respectively containing work buffer pointers to different ones of said work buffers for said DMA controlling user process, each work buffer pointer being unique to said DMA controlling user process and said host processor having privileged access to said work buffer pointer registers whereby each work buffer pointer is unmodifiable by said DMA controlling user process either directly or indirectly; and
- means responsive to a user DMA instruction from said DMA controlling user process for reading graphics commands and graphics primitives specified in said user DMA instruction from a work buffer selected by the user at the address pointed to by the corresponding work buffer pointer, and for transferring, via DMA, said graphics commands and graphics primitives from said selected work buffer to said graphics subsystem.

23. A device as in claim 22, wherein said work buffer pointer registers may not be accessed by the DMA controlling user process and are updated by said host processor to include updated work buffer pointers when the DMA controlling user process is swapped out.

24. A device as in claim 23, wherein said work buffer pointer registers are mapped onto at least one privileged page in said main memory so as to prevent access by the DMA controlling user process.

25. A device as in claim 22, wherein said reading and transferring means comprises means responsive to said user DMA instruction for specifying which of said work buffer pointer registers a work buffer pointer is to be read from and hence which work buffer said graphics commands and graphics primitives are to be read from.

26. A device as in claim 25, wherein said specifying means further specifies the number of words to be read from the specified work buffer.

27. A device as in claim 26, wherein said specifying means comprises a control register which initiates said data reading and transferring when a user DMA instruction requesting DMA is received from the DMA controlling user process.

28. A device as in claim 27, wherein said control register includes status means for determining at least one of whether a data reading and transferring process is in progress, whether an error occurred in previous data reading and transferring process, which of said work buffer pointer registers is currently being read and the number of words currently being transferred.

29. A device as in claim 27, wherein said user DMA instruction includes instructions from the user as to which of said work buffers to read, the number of words to be read and when said read is to occur.

30. A device as in claim 22, wherein the work buffer pointers for the DMA controlling user process point to the starting address of the corresponding work buffer for the DMA controlling user process.

31. A device as in claim 22, wherein each work buffer pointer is an address offset used to determine an address within the corresponding work buffer.

32. A device as in claim 22, wherein said reading and transferring means comprises a bidirectional bus buffer and an input/output bus for connecting said graphics subsystem to said host processor and said main memory.

33. A device as in claim 32, wherein said bidirectional bus buffer provides noninterfering bidirectional data transfer between said main memory and said graphics subsystem in response to said user DMA instruction.

34. A device as in claim 22, further comprising synchronizing means for synchronizing said host processor to reads by said reading and transferring means.

35. A device as in claim 22, further comprising means for providing data consistency in said main memory between subsequent reads by said reading and transferring means by selective use of data snooping and user controlled data flushing of a cache of said main memory.

36. A method for providing user controlled direct memory access (DMA) by an external data processing system to data stored in a main memory of a user's host system having a host processor in response to a user DMA command, comprising the steps of:
- defining a work buffer in said main memory for each of a plurality of user processes being processed by the user's host system;
- writing the user's data processing commands and associated data in a work buffer which is locked by a DMA controlling user process of said user's host system;
- defining a work buffer pointer register for said DMA controlling user process, said work buffer pointer register containing a work buffer pointer to said work buffer locked by said DMA controlling user process, said work buffer pointer being unique to said DMA controlling user process and said host processor having privileged access to said work buffer pointer register whereby said work buffer pointer is unmodifiable by said DMA controlling user process either directly or indirectly;
- reading, in response to said DMA command from said DMA controlling user process, said data processing commands and associated data from said work buffer locked by said DMA controlling user process starting at an address pointed to by the work buffer pointer for said DMA controlling user process; and
- transferring, via DMA, said data processing commands and associated data from said work buffer locked by said DMA controlling user process to said external data processing system.

37. A method as in claim 36, wherein said external data processing system comprises a graphics subsystem of said user's host system, said user's data processing command is a graphics command and said associated data comprises graphics primitives.

38. A method as in claim 37, wherein said work buffer defining step defines two work buffers for each user process such that one work buffer may be read while the other is written.

39. A method as in claim 38, wherein said work buffer pointer register defining step defines two work buffer pointer registers for each user process, one for each work buffer, each work buffer pointer register containing a work buffer pointer to different ones of said work buffers and each work buffer pointer being unique to the DMA controlling user process.

40. A method as in claim 39, wherein said work buffer pointer register defining step includes the steps of mapping the work buffer pointer registers onto a privileged memory page so as to be inaccessible to the DMA controlling user process and updating the work buffer pointers in said work buffer pointer registers to include updated work buffer pointers when the DMA controlling user process is swapped out.

41. A method as in claim 40, including the further steps of specifying which work buffer to read said data processing commands and associated data from and reading the work buffer pointer from the work buffer pointer register corresponding to the specified work buffer.

42. A method as in claim 41, wherein said specifying step includes the step of specifying the number of words to be read from the specified work buffer during said reading step.

43. A method as in claim 36, comprising the further step of determining the address of said data processing commands and associated data in said work buffer by using said work buffer pointer as an index within said work buffer.

44. A method as in claim 36, comprising the further step of synchronizing the DMA controlling user process to said reading step.

45. A method as in claim 36, comprising the further step of flushing a cache memory of said main memory before said data transferring step is attempted.

46. A method for providing user controlled direct memory access (DMA) by an external data processing system to data stored in a main memory of a user's host system having a host processor in response to a user DMA command, comprising the steps of:

defining at least two work buffers in said main memory for each of a plurality of user processes being processed by the user's host system;

acquiring a memory lock on said work buffers for a DMA controlling user process being implemented by said user's host system;

writing the user's data processing commands and associated data to one of the work buffers defined for said DMA controlling user process;

defining work buffer pointer registers respectively containing work buffer pointers to different ones of said work buffers for said DMA controlling user process, each work buffer pointer being unique to said DMA controlling user process and said host processor having privileged access to said work buffer pointer registers whereby each work buffer pointer is unmodifiable by said DMA controlling user process either directly or indirectly; and issuing said user DMA command to start DMA from a selected one of said work buffers;

reading said data processing commands and associated data from the selected work buffer starting at an address pointed to by the work buffer pointer corresponding to the selected work buffer for said DMA controlling user process; and transferring said data processing commands and associated data from said selected work buffer to said external data processing system.

47. A method as in claim 46, wherein said user's data processing commands and associated data are written to the other of said work buffers when said selected work buffer is being read.

48. A method as in claim 47, wherein said work buffers may be swapped by issuing another user DMA command to start DMA from the other of said work buffers.

* * * * *